Jan. 10, 1961 A. A. ZUHN 2,967,518
ENGINE EXHAUST VALVE COOLING MEANS
Filed Nov. 6, 1959
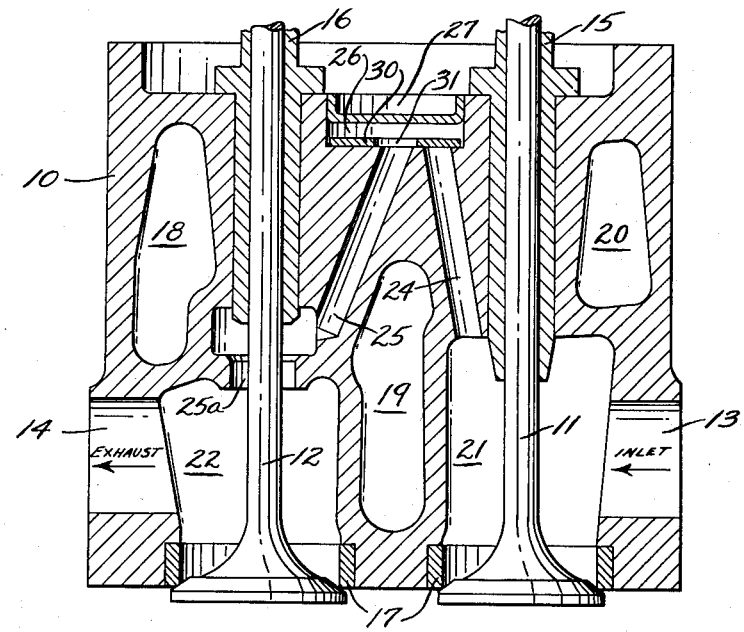
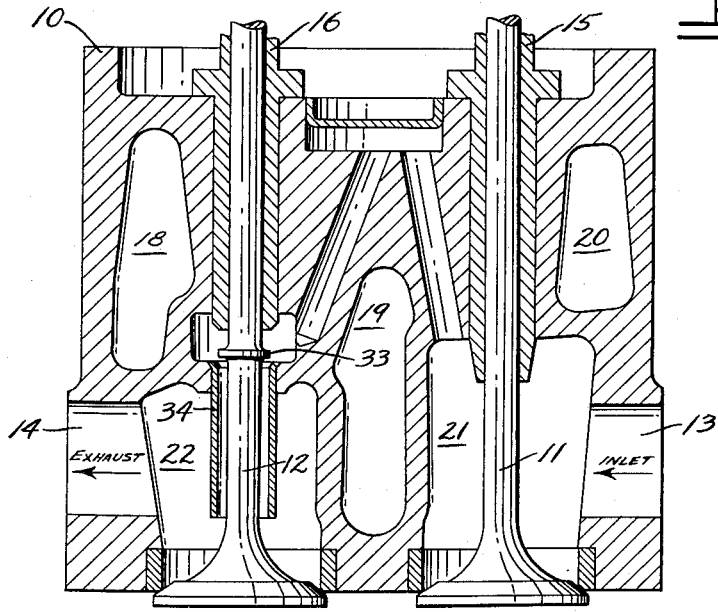
INVENTOR.
ARTHUR A. ZUHN
BY
ATTORNEYS

United States Patent Office 2,967,518
Patented Jan. 10, 1961

2,967,518

ENGINE EXHAUST VALVE COOLING MEANS

Arthur A. Zuhn, East Peoria, Ill., assignor to Caterpillar Tractor Co., Peoria, Ill., a corporation of California Filed Nov. 6, 1959, Ser. No. 851,405

5 Claims. (Cl. 123—41.77)

This invention relates to the cooling of engine exhaust valves and more particularly to means for directing a portion of the relatively cool intake air from the intake valve chambers of an internal combustion engine into the corresponding exhaust valve chambers and against the body of the valve therein.

With the present trend toward increasing horsepower of internal combustion engines through supercharging and other means, exhaust valves are sometimes operated at excessive temperatures and become a factor which limits the potential horsepower output for an engine of a given size.

It is the object of the present invention to provide means for directing cool air onto the exhaust valves of an engine to cause them to operate at relatively low temperatures.

A further object is to direct intake air from the vicinity of an intake valve to the vicinity of the exhaust valve which serves the same engine cylinder.

Another object is to provide means to prevent back flow of such air toward the intake valve.

A still further object is to provide means for cooling the exhaust valve of a supercharged engine with air that can be directed through the exhaust valve to the supercharger turbine of the engine so that heat absorbed by the air will serve a useful purpose in increasing the output of the supercharger.

Further and more specific objects and advantages of the invention and the manner in which it is carried into practice are made apparent in the following specification wherein reference is made to the accompanying drawing.

In the drawing:

Fig. 1 is a view in cross section through the cylinder head of an engine taken through the center line of the intake and exhaust valves for one cylinder and illustrating a preferred form of the present invention; and Fig. 2 is a view like Fig. 1 showing a modified form of the invention.

The cylinder head of a typical internal combustion engine is represented in section at 10 in the drawing and in practice is secured to the top of a cylinder block of conventional construction, not shown, with an intake valve 11 and an exhaust valve 12 disposed over each cylinder of the block for the properly timed admission of air from an intake manifold, not shown, through an inlet port 13 and discharge of air through an exhaust port 14 from whence it passes through a conventional exhaust manifold and, if the engine includes a supercharger, the exhaust gases are directed to the supercharger turbine for driving the supercharger blower which supplies air to the inlet passages 13. The stems of the valves 11 and 12 are reciprocably mounted in suitable guides 15 and 16, respectively, and the bodies of the valves close against seats or valve inserts such as shown at 17. The head block is cored to provide passages for coolant such as indicated at 18, 19 and 20 and to provide an inlet valve chamber 21 and an exhaust valve chamber 22.

In accordance with the present invention, a passageway is provided between the inlet valve chamber and the exhaust valve chamber and as shown in the drawing, this passageway comprises a bore 24 and a bore 25 extending between the chambers and a common recess 26 in the top of the head block which may be closed as for example by a conventional core plug shown at 27. This enables a portion of the air which enters the inlet chamber 21 to pass or cross over to the exhaust valve chamber 22 and to be directed downwardly against the back of the body of the exhaust valve 12 absorbing heat from that portion of the valve which is the hottest during the operation of an engine. An opening 25a concentric with the valve stem aids in properly directing the air.

Under certain conditions, such for example as during low speed or low idle operation, an engine will operate below the pressure crossover point, being the point where pressures in the inlet and exhaust manifolds are equal and below which the exhaust pressure exceeds the inlet pressure. This could cause a reversal of flow to the passages which connect the valve chambers and to prevent this from occurring, the present invention includes valve means associated with these passages. In Fig. 1 of the drawing, such valve means is shown as a valve disc 30 disposed in the chamber 26 with which both of the passages 24 and 25 communicate. The disc 30 has a central perforation 31 overlying the end of the passage 25 which communicates with the exhaust valve chamber while the peripheral portion of the disc overlies and closes the passage 24 communicating with the intake valve chamber. Since the chamber 26 is of cylindrical form, the perforated disc 30 may be loosely positioned therein and need not be retained against rotating movement to retain its desired valving position. Air from the intake valve chamber 21 will raise the disc and be admitted to the exhaust valve chamber but when the engine is operating below the pressure crossover point, the air cannot flow in a reverse direction because it will be trapped in the chamber 26 above the disc 30.

An alternate form of valving means for preventing back flow of air is shown in Fig. 2 wherein, in place of the disc in the chamber 26, the stem of the exhaust valve 12 is provided with an annular projection or valve element 33 adapted to enter and close a tubular sleeve 34 which extends downwardly within the exhaust valve chamber. Thus whenever the exhaust valve is open admitting higher pressure to the chamber 22 which exceeds the pressure in chamber 21, reverse flow of such pressure is prevented by the valve element 33. The tubular sleeve 34 also serves to direct the air against the body of the valve.

One important advantage of this system of cooling the exhaust valves of an engine resides in the fact that some intake air may be employed without loss of energy ordinarily to be expected by reduction in intake volume. This is true where the system is used with engines employing a supercharger actuated by exhaust gases, because the air from the intake passage absorbs heat from contact with the exhaust valve, thereby increasing the heat content of the air before it is directed to the turbine of the supercharger. In this manner energy in the form of heat which might otherwise be dissipated through the engine coolant to the atmosphere is recovered and converted into physical energy for increasing the supply of intake air to the engine.

I claim:

1. The combination with the cylinder head of an internal combustion engine having an intake valve controlling the admission of air to an engine cylinder and an exhaust valve controlling exhaust of gases from the same cylinder, an intake valve chamber in the head through which air approaches the intake valve, an exhaust valve chamber in the head through which gas is exhausted from the cylinder, and a passageway entirely within the head forming communication between said chambers, whereby some intake air is communicated to the exhaust valve chamber to cool the exhaust valve.

2. The combination with an internal combustion engine having an intake valve controlling the admission of air to an engine cylinder and an exhaust valve controlling exhaust of gases from the same cylinder, an intake valve chamber through which air approaches the intake valve, an exhaust valve chamber through which gas is exhausted from the cylinder, a passageway forming communication between said chambers, whereby some intake air is communicated to the exhaust valve chamber to cool the exhaust valve, and check valve means in said passageway to prevent flow of exhaust gas toward the intake chamber.

3. The combination with an internal combustion engine having an intake valve controlling the admission of air to an engine cylinder and an exhaust valve controlling exhaust of gases from the same cylinder, an intake valve chamber through which air approaches the intake valve, an exhaust valve chamber through which gas is exhausted from the cylinder, means forming communication between the intake and exhaust valve chambers comprising a bore extending from each chamber to a common chamber, and a check valve disc overlying both bores in the common chamber and having an opening registering only with the bore which leads to the exhaust valve chamber.

4. The combination with an internal combustion engine having an intake valve controlling the admission of air to an engine cylinder and an exhaust valve controlling exhaust of gases from the same cylinder, an intake valve chamber through which air approaches the intake valve, an exhaust valve chamber through which gas is exhausted from the cylinder, a passageway for directing air from the intake chamber to the exhaust valve chamber, said exhaust valve having a body and a stem, and a sleeve communicating with said passageway and surrounding said stem to direct the air against the body of the valve.

5. The combination with an internal combustion engine having an intake valve controlling the admission of air to an engine cylinder and an exhaust valve controlling exhaust of gases from the same cylinder, an intake valve chamber through which air approaches the intake valve, an exhaust valve chamber through which gas is exhausted from the cylinder, a passageway for directing air from the intake chamber to the exhaust valve chamber, said exhaust valve having a body and a stem, a sleeve communicating with said passageway and surrounding said stem to direct the air against the body of the valve and a valve element on the stem of the exhaust valve positioned to enter and close said sleeve when the exhaust valve opens to prevent reverse flow of exhaust pressure through said passageway.

References Cited in the file of this patent

UNITED STATES PATENTS 2,215,579    Eichelberg _____ Sept. 24, 1940